(12) United States Patent
Kitson et al.

(10) Patent No.: US 8,634,151 B2
(45) Date of Patent: Jan. 21, 2014

(54) REFLECTIVE DISPLAY DEVICE

(75) Inventors: Stephen Kitson, Bristol (GB); Adrian Geisow, Portishead (GB); Timothy Taphouse, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/387,309

(22) PCT Filed: Oct. 22, 2009

(86) PCT No.: PCT/US2009/061627
§ 371 (c)(1),
(2), (4) Date: Jan. 26, 2012

(87) PCT Pub. No.: WO2011/049570
PCT Pub. Date: Apr. 28, 2011

(65) Prior Publication Data
US 2012/0194934 A1    Aug. 2, 2012

(51) Int. Cl.
*G02B 5/22*    (2006.01)
(52) U.S. Cl.
USPC .......................................................... 359/891
(58) Field of Classification Search
USPC .......... 359/599, 891; 349/115, 104, 105, 106, 349/88; 345/84
See application file for complete search history.

(56) References Cited

U.S. PATENT DOCUMENTS

| | | | |
|---|---|---|---|
| 6,266,113 B1 * | 7/2001 | Yamazaki et al. | 349/115 |
| 2003/0197820 A1 * | 10/2003 | Hiji et al. | 349/115 |
| 2009/0140961 A1 | 6/2009 | Geisow et al. | |

FOREIGN PATENT DOCUMENTS

| | | |
|---|---|---|
| JP | 09160067 A | 6/1997 |
| JP | 10239684 | 9/1998 |
| JP | 2000147547 | 5/2000 |
| JP | 2002072243 | 3/2002 |

OTHER PUBLICATIONS

Chen, Yongda et al., Extending Printing Color Gamut by Optimizing the Spectral Reflectance of Inks, Munsell Color Science Laboratory, Rochester Institute of Technology, Rochester, New York. ISST/SIC 12th Color Imaging Conference, p. 163-169, 2004.

Cole, H. S., Kashnow, R. A., A new reflective dichroic liquid-crystal display device, General Electric Research and Development Center, Schenectady, New York 12301, Apr. 7, 1977, Download Date: Oct. 19, 2009.

(Continued)

*Primary Examiner* — Alessandro Amari
*Assistant Examiner* — Jie Lei

(57) ABSTRACT

A reflective display device includes a first absorption layer configured to be modulated between being strongly and weakly absorbing of light within a first specified wavelength band and to absorb light weakly in a second specified wavelength band and a third specified wavelength band, a second absorption layer configured to be modulated between being strongly and weakly absorbing of light within the second specified wavelength band and to absorb light weakly within the third specified wavelength band, a third absorption layer configured to be modulated between being strongly and weakly absorbing of light within at least the third specified wavelength band, and at least one reflector arranged between two of the first, second, and third absorption layers, the at least one reflector being configured to reflect light strongly within one of the specified wavelength bands assigned to the absorption layers above the at least one reflector.

16 Claims, 5 Drawing Sheets

(56) References Cited

OTHER PUBLICATIONS

Hunt, R.W.G, 9 The Colorimetry of Subtractive Systems, The Reproduction of Colour, Sixth Edition, John Wiley & Sons, Ltd. ISBN: 0-470-02425-9, 2004.

International Search Report and Written Opinion for PCT/US2009/061627, Jun. 29, 2010, 14 pages.

White, Donald L. et al., New absorptive mode reflective liquid-crystal display device, Bell Laboratories, Murray Hill, New Jersey 07974, Jan. 9, 1974. Download date: Oct. 19, 2009.

* cited by examiner ns of light outside of the specified wavelength bands are less than the absorption within the specified wavelength bands, the absorptions may not be completely filtered and may instead affect light outside of the specified wavelength bands. -->

REFLECTIVE DISPLAY DEVICE

CLAIM FOR PRIORITY

The present application is a national stage filing under 35 U.S.C 371 of PCT application number PCT/US2009/061627, having an international filing date of Oct. 22, 2009, the disclosure of which is incorporated by reference in its entirety.

RELATED APPLICATIONS

The present application contains some common subject matter with U.S. patent application Ser. No. 12/325,601, entitled "Reflective Display", filed on Dec. 1, 2008 by Adrian Geisow and Stephen Kitson, and U.S. patent application Ser. No. 11/629,692, entitled "Liquid Crystal Display Device", filed on Dec. 12, 2007 by Susanne Klein and Adrian Geisow, the disclosures of which are incorporated by reference in their entireties.

BACKGROUND

A reflective display is a non-emissive display in which ambient light for viewing the displayed information is reflected from the display back to the viewer rather than light from behind the display being transmitted through the display. An example of a reflective display is shown in FIG. 1, which depicts a conventional display device 100 formed of a stack of controllable absorption layers used to allow independent control of different colors. More particularly, the conventional display device 100 is formed of a stack of selective absorption layers 108B, 108R, and 108G formed of dye guest/host liquid crystal (LC) layers made to absorb, respectively, blue, red and green light. The blue-absorbing layer 108B is at the top of the stack and the green-absorbing layer 108G is at the bottom of the stack.

Each of the absorption layers 108B, 108R, and 108G is sandwiched between respective pairs of transparent substrates 104 and transparent conductors 106 and are configured to be wholly or partially actuated by the application of suitable electric signals via the conductors 106. Thus, selected pixel regions of each of the absorption layers 108B, 108R, and 108G may be made either to absorb light in a particular wavelength band or substantially to transmit all incident light. The stack also includes a mirror 110W that functions as a broadband reflector that reflects light of all wavelengths back through the layers of the stack to the viewer 112.

As with many color reflective display technologies, the brightness and color gamut of these types of conventional reflective displays is limited, in part, due to absorption and stray reflection in the numerous electrode and substrate layers that are required to achieve full color. For instance, both brightness and contrast are limited by the dichroic ratios of the absorbing species (anisotropic dye), the angular dependence of the incident light, and the degree to which the dichroic absorbers can be oriented by the LC in each of the absorption layers 108B, 108R, and 108G.

This loss in brightness and contrast in conventional reflective displays may be seen graphically in the charts 200 and 220 depicted in FIGS. 2A and 2B, respectively. The chart 200 in FIG. 2A depicts an absorption spectra 202 for an ideal display of colors, in which, the colors, in this case, yellow 204, magenta 206, and cyan 208 are each neatly in their respective wavelength bands and form a top-hat formation. In this ideal case, a yellow layer is made to only absorb blue light, a magenta layer is made to only absorb green light, and a cyan layer is made to only absorb red light.

In real situations, however, the absorption characteristics of light in different wavelength bands 224-228 by the absorption layers 108B, 108R, and 108G is more Gaussian in nature and tend to be much broader on the short wavelength side of the peak than on the long wavelength side, as shown in the chart 220 in FIG. 2B. This means that all of the absorption layers 108B, 108R, and 108G are absorbing some blue light, and the magenta and cyan layers are both absorbing some green light. As a consequence, there is a relatively large amount of losses in the light that enters the stack and is reflected out of the stack.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to exemplary embodiments. In the following description, numerous specific details are set forth to provide a thorough understanding of the embodiments. However, it will be apparent to one of ordinary skill in the art that the present invention may be practiced without limitation to these specific details. In other instances, well known methods and structures have not been described in detail to avoid unnecessarily obscuring the description of the embodiments.

In an embodiment of the present invention, a reflective display device is formed of a plurality of absorption layers configured to absorb light in selected wavelength bands. In various instances, the wavelengths in the selected wavelength bands of one or more of the plurality of absorption layers may overlap with each other. The reflective display device may also include one or more reflectors positioned between two of the plurality of absorption layers, in which, the reflector(s) are configured to reflect light strongly within one of the selected wavelength bands of light assigned to the absorption layers above the reflector(s). In addition, at least one of the absorption layers beneath the reflector(s) is configured to more than weakly absorb light within the wavelength band that the reflector(s) arranged above the at least one absorption layer is configured to strongly reflect. As discussed in greater detail herein below, the absorption layers and the reflector(s) are selected to absorb and reflect light having different colors in various arrangements that optimize, for instance, the brightness, color gamut, and/or contrast of light reflected from the display device.

The term "mainly" is used herein with reference to the specified wavelength bands to denote that while the absorption layers are configured to primarily be modulated between being strongly and weakly absorbing of light in one or more particular wavelength bands, the absorption layers may, in various instances, also incidentally absorb light in one or more other wavelength bands. The term "beneath" is used herein with reference to the relationship between a controllable absorption layer and its corresponding reflector, to denote that the reflector is disposed to receive incident light after the light has passed through the absorption layer. The articles "a" and "an" are used herein to denote "at least one" unless the context otherwise dictates.

Figure 3:
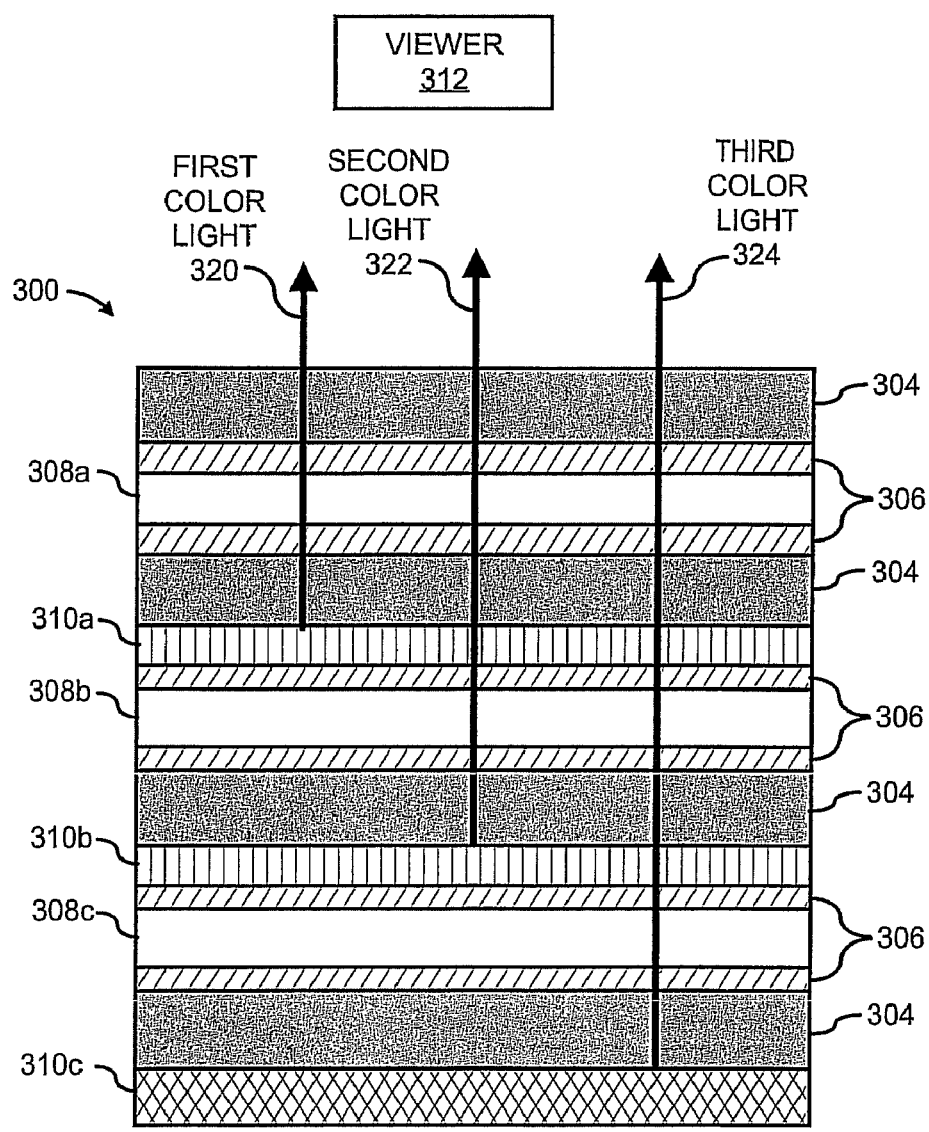
FIG. 3 shows a diagram of a reflective display device, according to an embodiment of the invention.

With reference first to FIG. 3, there is shown a diagram of a reflective display device 300, according to an embodiment of the invention. It should be understood that the display device 300 depicted in FIG. 3 may include additional components and that some of the components described herein may be removed and/or modified without departing from a scope of the display device 300. It will also be understood that, for purposes of illustration, the various layers shown in FIG. 3 have been drawn not necessarily to scale.

As shown, the display device 300 is formed of a plurality of layers positioned in a stacked arrangement with respect to each other. More particularly, the display device 300 is formed of a plurality of absorption layers 308a-308c arranged between a plurality of transparent substrates 304 and electrode layers 306, which are configured to be wholly or partially actuated by the application of suitable electric signals via the electrode layers 306. Although not explicitly shown, other layers, such as thin LC alignment layers, may be provided between the absorption layers 308a-308c.

Figure 1:
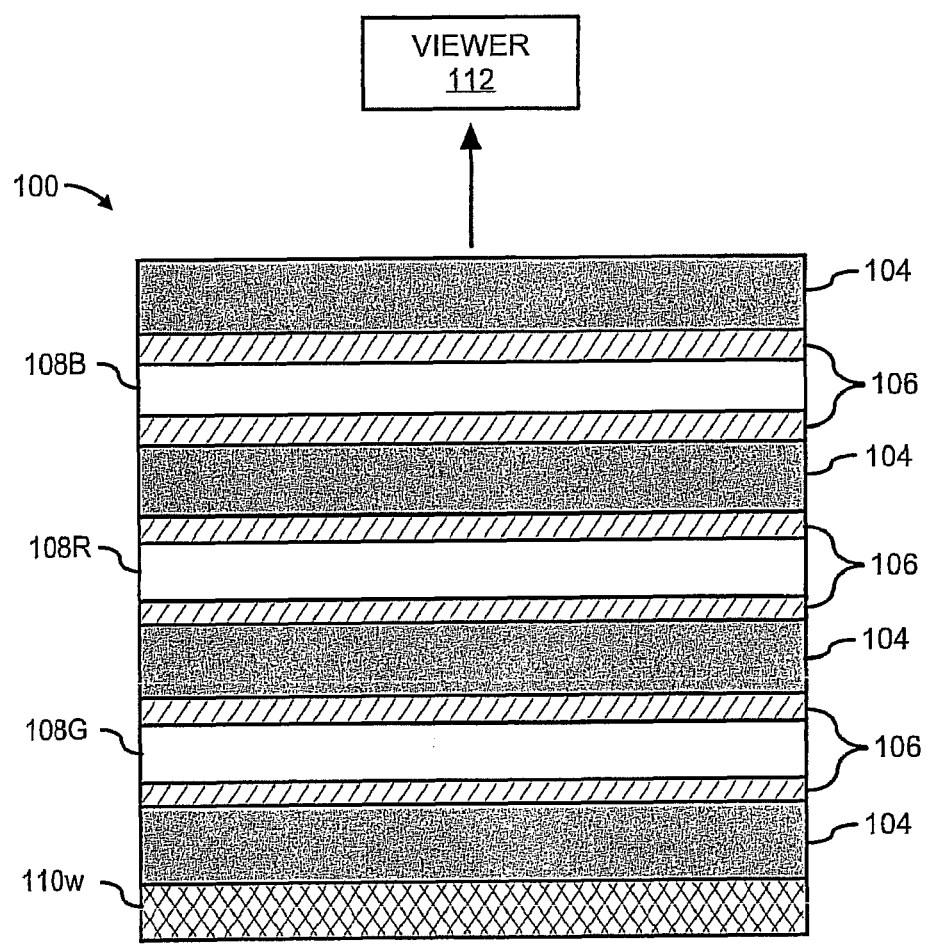
FIG. 1 shows a diagram of a conventional reflective display.
Figure 2A:
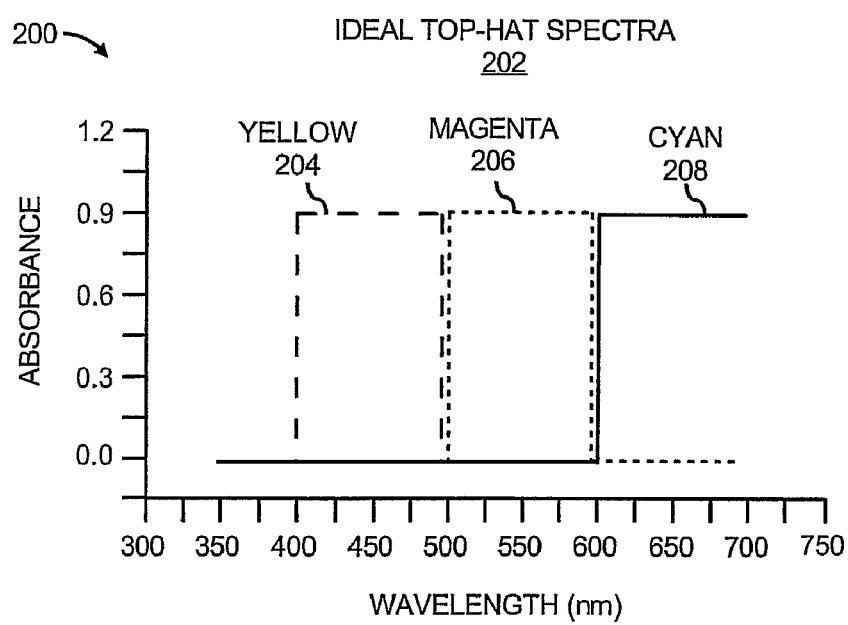
FIG. 2A shows a chart depicting the ideal absorbance spectra of different colors of a conventional reflective display.
Figure 2B:
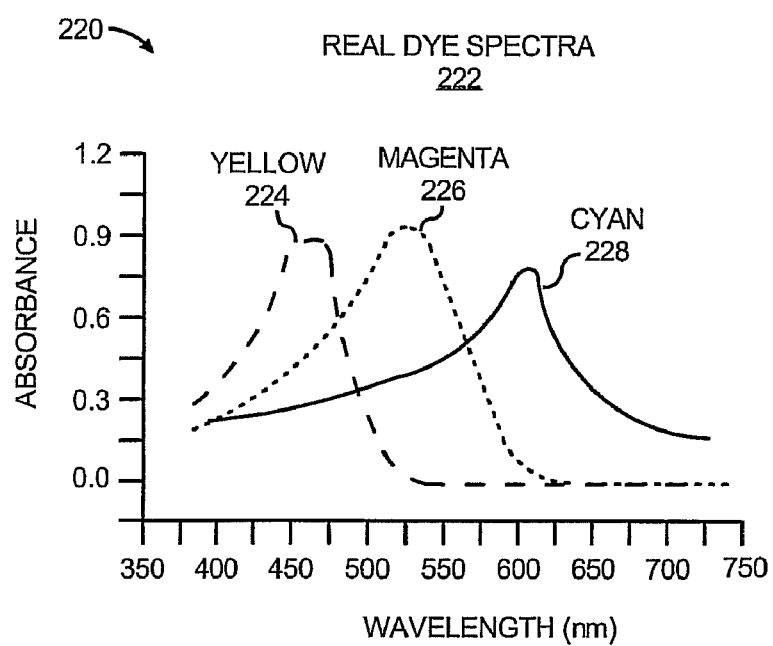
FIG. 2B shows a chart depicting an actual absorbance spectra of different colors of a conventional reflective display.

The absorption layers 308a-308c are configured to mainly absorb light in selected wavelength bands, such as, red, green, and blue. With reference to the chart 220 in FIG. 2B, for instance, the blue wavelength band includes wavelengths between about 400-490 nm, the green wavelength band includes wavelengths between about 490-580 nm, and the red wavelength band includes wavelengths between about 580-700 nm. These wavelength bands are derived from R. W. G. Hunt, Chapter 9, *The Reproduction of Colour*, 6$^{th}$ Edition, ISBN 978-0-470-02425-6.

In addition, the absorption layers 308a-308c are configured to mainly absorb the light in manners that yield substantially optimized brightness, color (gamut) and/or contrast characteristics. For instance, each of the absorption layers 308a-308c is configured to modulate the brightness of either red, green, or blue light at each point in the display device and have, at most, a relatively small degree of overlap in the bands of wavelengths. According to an embodiment, the relatively small degree of overlap is less than about 60 nm. According to another embodiment, the relatively small degree of overlap is less than about 20 nm. According to a further embodiment, the relatively small degree of overlap is less than about 10 nm. Also discussed herein below is a method of optimizing the display device 300 by selecting and arranging absorption layers having predefined characteristics.

Through application of suitable electrical signals through the electrode layers 306, entire or partial pixel regions of each of the absorption layers 308a-308c may be made either to absorb light strongly in at least a particular wavelength band or substantially to transmit all incident light. In addition, the absorption layers 308a-308c may be configured to absorb light weakly within one or more of the other particular wavelength bands.

Each of the absorption layers 308a-308c has an absorption spectrum with a strength that may be electrically switched to modulate the absorption layers 308a-308c between being strongly and weakly absorbing in one or more of the specified wavelength bands. In terms of being strongly absorbing of light, according to an embodiment, each of the absorption layers 308a-308c is configured to absorb more than about 50% of the light within the assigned specified wavelength band. According to another embodiment, each of the absorption layers 308a-308c is configured to absorb more than about 70% of the light within the assigned specified wavelength band. According to a further embodiment, each of the absorption layers 308a-308c is configured to absorb more than about 90% of the light within the assigned specified wavelength band.

In terms of being weakly absorbing of light, according to an embodiment, each of the absorption layers 308a-308c is configured to absorb less than about 10% of the light within the assigned specified wavelength band. According to another embodiment, each of the absorption layers 308a-308c is configured to absorb less than about 5% of the light within the assigned specified wavelength band. According to a further embodiment, each of the absorption layers 308a-308c is configured to absorb less than about 2% of the light within the assigned specified wavelength band.

Each of the absorption layers 308a and 308b is also configured to weakly absorb light with wavelengths that are outside of the assigned wavelength band and that overlap the wavelength bands assigned to lower layers. According to an embodiment, each of the absorption layers 308a and 308b is configured to absorb less than about 10% of this light. According to another embodiment, each of the absorption layers 308a and 308b is configured to absorb less than about 5% of this light. According to a further embodiment, each of the absorption layers 308a and 308b is configured to absorb less than about 2% of this light.

The absorption layers used in conventional reflective displays tend to have absorption spectra that are asymmetric in that one edge is sharper than the other. In addition, there is often an absorption tail that extends to one side, typically to the shorter wavelengths in the absorption spectra. According to an embodiment, and as discussed in greater detail herein below, the order of the absorption layers 308a-308c in a stack is selected to substantially minimize the overlap between any tails and the wavelength bands assigned to lower layers in the stack.

According to an embodiment, a first absorption layer 308a is configured to be modulated between being strongly and weakly absorbing of light within a first specified wavelength band and configured to absorb light weakly in a second specified wavelength band and a third specified wavelength band. In this embodiment, a second absorption layer 308b is configured to be modulated between being strongly and weakly absorbing of light within the second specified wavelength band and to absorb light weakly within the third specified wavelength band. In addition, a third absorption layer 308c is configured to be modulated between being strongly and weakly absorbing of light within at least the third specified wavelength band. Moreover, at least one reflector 310a, 310b is arranged between two of the first, second, and third absorption layers 308a-308c. The at least one reflector 310a, 310b is configured to reflect light strongly within one of the specified wavelength bands assigned to the absorption layers 308a, 308b above the at least one reflector 310a, 310b. Furthermore, at least one of the absorption layers 308b, 308c beneath the at least one reflector 310a, 310b is configured to more than weakly absorb light within the wavelength band that the at least one reflector 310a, 310b arranged above the at least one absorption layer 308b, 308c is configured to strongly reflect.

Thus, for instance, if a first reflector 310a is positioned between the first and second absorption layers 308a and 308b, the second and third absorption layers 308b and 308c may more than weakly absorb light that the first reflector 310a is configured to strongly reflect. In other words, and according to an embodiment, the second and third absorption layers 308b and 308c may absorb more than more than about 10% of this light. According to another embodiment, the second and third absorption layers 308b and 308c may absorb more than more than about 5% of this light. According to a further embodiment, the second and third absorption layers 308b and 308c may absorb more than more than about 2% of this light.

The second and third absorption layers 308b and 308c may, moreover, strongly absorb light that the first reflector 310a is configured to strongly reflect when the first reflector 310a is positioned between the first and second absorption layers 308a and 308b. In terms of being strongly absorbing of light, according to an embodiment, the second and the third absorption layers 308b and 308c are configured to absorb more than about 50% of the light within one or more of the specified wavelength bands assigned to the absorption layers 308a and 308b higher in the stack. According to another embodiment, the second and the third absorption layers 308b and 308c are configured to absorb more than about 70% of the light within one or more of the specified wavelength bands assigned to the absorption layers 308a and 308b higher in the stack. According to a further embodiment, the second and third absorption layers 308b and 308c are configured to absorb more than about 90% of the light within one or more of the specified wavelength bands assigned to the absorption layers 308a and 308b higher in the stack.

In addition, or alternatively, if a second reflector 310b is positioned between the second and third absorption layers 308b and 308c, the third absorption layer 308c is configured to more than weakly absorb light that one or both of the first reflector 310a and the second reflector 310b are configured to strongly reflect. Furthermore, the third absorption layer 308c may be configured to strongly absorb light that one or both of the first reflector 310a and the second reflector 310b are configured to reflect.

Each of the absorption layers 308a-308c is configured to selectively have one of a plurality of states depending upon an electrical field applied across the respective electrode layers 306. According to another example, the absorption layers 308a-308c comprise bistable devices and are thus configured to retain their states following removal of the electrical field. Thus, for instance, entire or partial pixel regions of each of the absorption layers 308a-308c are configured to be in a first state when an electrical field is applied across their respective electrode layers 306 and to be in a second state when an electrical field is not applied across their respective electrode layers 306 or vice versa. In another example, entire or partial pixel regions of each of the absorption layers 308a-308c are configured to remain in the first state after application and removal of the electrical field and to be in a second state after application and removal of another electrical field.

In the first state, each of the absorption layers 308a-308c may be configured to absorb incident light mainly in a different specified wavelength band, for instance, as denoted by the arrows 320-324, which represent light in different wavelength bands. In addition, in any of the plurality of states, the first absorption layer 308a (first means of modulating the absorption of light strongly in a first specified wavelength band) is configured to absorb light weakly in the wavelength bands outside of the first specified wavelength band. In addition, the second absorption layer 308b (second means of modulating the absorption of light strongly in a second specified wavelength band) may be configured to absorb light weakly in the third wavelength band. Moreover, the second absorption layer 308b and/or the third absorption layer 308c (third means of modulating the absorption of light strongly within at least the third wavelength band) are configured to more than weakly absorb light in at least one of the first and second specified wavelength bands depending upon whether a first reflector 310a and/or a second reflector 310b are arranged between two of the first, second, and third absorption layers 308b and 308c, as discussed above.

In each of the second states, entire or partial pixel regions of the absorption layers 308a-308c are configured to be weakly absorbing in the wavelength band assigned to that layer. Thus, for instance, the characteristics of an image displayed on the display device 300 may be varied based upon which sections of which of the absorption layers 308a-308c are provided with an electric field. The characteristics of the image may further be varied based upon the intensities of the electric field applied to the sections of the absorption layers 308a-308c, for instance, to control gray-scaling of a displayed image. Moreover, in instances where the absorption layers 308a-308c comprise bistable devices, the characteristics of the image may remain in a varied state following removal of the electric field.

The absorption layers 308a-308c may be formed of guest-host structures, such as, a dichroic dye dissolved in a liquid crystal (LC) host. For instance, a dichroic dye comprising a dye molecule that absorbs the component of light in a particular wavelength band that has its electric field vector oriented along one axis, defined by the absorption dipole of the dye molecule, but not along other directions may be placed in the LC host. Thus, the dye molecules are the guest in the LC host, and the LC host may then be used to orient the dye molecules. The guest may also comprise dichroic pigments or other colorants in addition to or in place of the dye molecules.

In addition or alternatively, one or more of the absorption layers 308a-308c comprises a nematic liquid crystal (LC). A nematic LC with positive dielectric anisotropy includes a number of rod-like molecules having electric dipole moments and thus may be aligned along the direction of an electric field. A nematic LC with negative dielectric anisotropy includes a number of rod-like molecules having electric dipole moments, which may be orthogonal to the long axis of the molecules and thus may be aligned along a direction orthogonal to the electric field. According to another example, one or more of the absorption layers 308a-308c comprises smectic LCs, which also have orientational order and may be aligned in an electric field, but also have positional order. According to a further example, the absorption layers 308a-308c include electrophoretic display in which colored pigments are swept in or out of the field of view, or spread across the pixel area instead of being gathered into a relatively small region. In this example, the pigments are moved by electrophoresis. According to a yet further example, the absorption layers 308a-308c may comprise electrowetting display components.

For example, to put the absorption layers 308a-308c with LCs with dichroic dyes, in which the LCs have a positive dielectric anisotropy, into a primarily transparent state, an electric field may be applied to the absorption layers 308a-308c to orient the absorption dipoles perpendicular to the layers. To put the absorption layers 308a-308c into an absorbing state, the electric field may be removed from the absorption layers 308a-308c, which causes the absorption dipoles to become primarily oriented in the plane of the absorption layers 308a-308c, assuming that the inner surfaces of the substrates 304 are coated with a planar alignment material, such as, rubbed polyimide. By way of particular example, when the display device 300 is operated to display colors other than blue, the first absorption layer 308a may be configured to absorb light in the wavelength band that is equivalent to the color blue by controlling the LC to orient the blue absorption dipoles to be substantially planar with the first absorption layer 308a.

The electrode layers 306 are each formed of a transparent electrically conducting material and/or formed of relatively thin strips of a non-transparent (or semi-transparent) electrically conducting material. By way of example, the electrode layers 306 are formed of indium tin oxide, metal, or other electrically conductive material. The electrode layers 306 are also connected to a controllable power supply source (not shown). A controller (not shown) may control the power supply source to selectively energize the electrode layers 306 and thereby vary the states of entire or partial pixel regions of the absorption layers 308a-308c and thus the colors of an image displayed by the display device 100. The power supply source and the controller may individually or in combination form a means for selectively controlling each of the first means, the second means, and the third means discussed above.

The display device 300 is further depicted as including a plurality of the reflectors 310a-310c positioned beneath respective ones of the absorption layers 308a-308c. More particularly, the first reflector 310a is positioned beneath the first absorption layer 308a and between the first absorption layer 308a and the second absorption layer 308b. In addition, the second reflector 310b is positioned beneath the second absorption layer 308b and between the second absorption layer 308b and the third absorption layer 308c. Moreover, the third reflector 310c is positioned beneath the third absorption layer 308c.

The reflectors 310a-310c may be formed of any of a number of conventional structures and through any of a number of conventional methods, such as, layers of curable cholesteric liquid crystal materials (it may be desirable to include two layers, one to reflect each of left and right hand polarizations of light) or Bragg reflective stacks. In addition, each of the first and second reflectors 310a and 310b may comprise a wavelength selective reflector and a third reflector 310c may comprise a broadband reflector. That is, the first and second reflectors 310a and 310b may be configured to reflect light strongly within selected wavelengths, while the third reflector 310c may be configured to reflect light having a broader range of wavelengths.

Each of the reflectors 310a-310c may be arranged immediately under a respective absorption layer 308a-308c, before the incoming light has hit the second electrode for that layer, which provides the least loss for that part of the spectrum, at the cost of increasing the distance of the second electrode from the absorption layer. Alternatively, the reflectors 310a-310c may be arranged anywhere between the layer whose spectrum it matches and the next layer. According to an example, the reflectors 310a-310c are formed of a conductive material. In this example, the reflectors 310a-310c may operate as an electrode layer 306 for a neighboring absorption layer, thereby reducing the number of layers in the display device 300.

Figure 4:
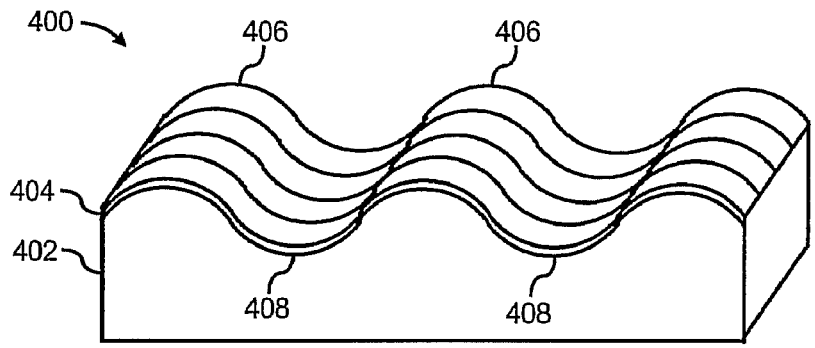
FIG. 4 shows a cross-sectional perspective view of a portion of one or more of the reflectors contained in the reflective display device of FIG. 3, according to an embodiment of the invention.

According to an embodiment, one or more of the reflectors 310a-310c include a roughened surface, for instance as shown in FIG. 4. FIG. 4, more particularly, depicts a cross-sectional perspective view of a portion of a reflector 400, which may comprise any of the first, second, and third reflectors 310a-310c, according to an example. As shown therein, the reflector 400 is formed of a base 402 and a multilayer dielectric mirror 404. The base 402 may be formed of any suitable material that is transparent to light in one or more wavelengths and is roughened to include a plurality of peaks 406 and valleys 408. The multilayer dielectric mirror 404 may comprise any suitable material configured to reflect light in at least one desired wavelength band and to enable light in other wavelength bands to pass therethrough.

According to an example, the multilayer dielectric mirror 404 is coated onto the base 402 through application of repeating pairs of high and low refractive index materials, each with a thickness of a quarter wavelength in that material. One result of this configuration is that a sharp reflectivity peak is created, which may be tuned by controlling the thicknesses of the layers in the dielectric mirror.

The period of roughness in the base 402, for instance, the period of the peaks 406, is selected to provide a predetermined angle over which light is scattered and an amplitude of roughness, for instance, the heights of the peaks 406, is selected to provide a predetermined scattering of the light. For instance, selection of a relatively narrow range of scattered angles results in more of the available light being reflected from the display device 300 within a relatively narrow cone, which provides a relatively brighter image, but with a relatively narrower viewing angle. In addition, selection of the amplitude of roughness determines how much of the incident light is scattered versus being specularly reflected. These trade-offs may be engineered through selection of a range of periodicities and amplitudes of the roughness of the base 402, as discussed with respect to the example below.

The roughened surfaces of one or more of the first, second, and third reflectors 310a-310c may cause light reflected therefrom to be diffusely scattered. However, it should be understood that one or more of the first, second, and third reflectors 310a-310c may have any other suitable configuration to achieve the diffuse scattering of the reflected light.

Typical wavelength selective reflectors have side bands on one or both sides of the main reflection peak. Through implementation of the present invention, however, the reflectors 310a-310c may be designed and fabricated to substantially minimize the overlap between side bands and the wavelength bands of the layers 308a-308c lower in the stack.

By way of particular example, at least one of the reflectors 310a-310c is designed to have a configuration according to:

3H (LH)$^m$ 3L H 4L, in which H is a quarter wavelength thickness with a first refractive index, L is a quarter wavelength thickness with a second lower refractive index, and m is a constant value. In one regard, the above-identified configuration substantially minimizes the side bands on the long wavelength side of the peak in absorption spectra to thus substantially prevent the reflectors from reflecting light in wavelength bands to be modulated by the absorption layers positioned beneath the reflectors.

Although the reflectors 310a-310c have been described as being formed using multilayer dielectric reflectors, other interlayer reflector approaches are possible, including, photonic crystals, cholesteric polymers, holograms, etc.

Through implementation of the reflectors 310a-310c, the light that is reflected from each of the reflectors 310a-310c is configured to match the spectral band absorbed by the preceding absorption layer. As such, the brightness, color gamut, and/or contrast of the light being reflected from the display device 300 may be substantially enhanced as compared with conventional reflective display devices. Each of the reflectors 310a-310c is configured to strongly reflect light within at least one of the specified wavelength bands assigned to the absorption layers 308a-308c above each of the respective reflectors 310a-310c and that substantially does not overlap with the wavelength bands assigned to lower layers. According to an example, each of the reflectors 310a-310c is configured to reflect more than about 50% of the light within at least one of the specified wavelength bands assigned to the absorption layers 308a-308c above each of the respective reflectors 310a-310c. According to another example, each of the reflectors 310a-310c is configured to reflect more than about 70% of the light within at least one of the specified wavelength bands assigned to the absorption layers 308a-309c above each of the respective reflectors 310a-310c. According to a further example, each of the reflectors 310a-310c is configured to reflect more than about 90% of the light within at least one of the specified wavelength bands assigned to the absorption layers 308a-308c above each of the respective reflectors 310a-310c.

Each of the first and second reflectors 310a and 310b is also configured to weakly reflect light within wavelength bands that overlap with the wavelength bands of lower layers 308b-308c. According to an embodiment, each of the first and second reflectors 310a and 310b is configured to reflect less than about 10% of the light within the overlapping wavelength bands. According to another embodiment, each of the first and second reflectors 310a and 310b is configured to reflect less than about 5% of the light within the overlapping wavelength bands. According to a further embodiment, each of the first and second reflectors 310a and 310b is configured to reflect less than about 2% of the light within the overlapping wavelength bands. Each of the second and third reflectors 310b and 310c may, however, also more than weakly reflect at wavelength bands that overlap the bands of layers 308a-308c closer to the top of the display 300.

For instance, if the first absorption layer 308a controls absorption mainly in the blue channel, the first reflector 310a is configured to strongly reflect blue light while only weakly reflecting light in other color channels. As such, red and green light will continue to the lower layers, for instance, with red light being modulated next. In the example where the second absorption layer 308b controls absorption mainly in the red channel, the second reflector 310b is configured to reflect at least red light while allowing at least green light to pass therethrough. The second reflector 310b may also be configured to allow blue light to pass therethrough, or to reflect the blue light, as well since most, if not all, of the blue light will have been reflected out by the first reflector 310a. Continuing with this example, the third absorption layer 308c controls absorption mainly in the green channel and the third reflector 310c is configured to reflect at least green light. For instance, the third reflector 310c may comprise a broadband reflector.

The lower absorption layers 308b and 308c need not be as spectrally selective as compared with lower absorption layers in conventional stacked display devices. In the example above, the second and third absorption layers 308b and 308c may also be configured to absorb blue light without substantially affecting the performance of the display device 300 because the second and third absorption layers 308b and 308c are underneath the blue reflector. In addition, the third absorption layer 308c may further be configured to absorb red light.

Dichroic dyes absorb only one polarization, however, to achieve a high contrast ratio, both polarizations are required to be absorbed. Standard techniques for absorbing both polarizations include those discussed in the Cole-Kashnow configuration, in which the LC switches between vertical and planar, untwisted configurations. In the planar state, only one polarization emerges. Quarter wave plates (not shown), which effectively rotate the plane of polarization by 90 degrees for reflected light that makes two passes through them so that both polarizations are more completely absorbed by the absorption layers 308a-308c, may be placed above each of the reflectors 310a-310c to improve the absorption of a given wavelength band. Thus, if the display device 300 includes a single reflector 310c, a single quarter wave plate may be placed above that reflector 310c. Another standard technique is the White-Taylor configuration, in which the planar state is twisted so that both polarizations are absorbed on each pass. Under this configuration, quarter wave plates are not required.

In addition to improving brightness, the display device 300 described here with certain embodiments may improve the viewing angle and/or contrast ratio and/or color gamut of a display. The contrast ratio and/or color gamut may be improved because of the increased efficiency with which the available light is used. In addition, the color gamut may be improved because each of the absorption layers 308a-308c modulates the intensity of light mainly within just one specified wavelength band and the reflectors 310a-310c have dealt with the intrinsically overlapping absorption spectra. This allows one to improve the black state by, for example, using thicker absorbing layers while maintaining an adequately bright white state. The viewing angle may be improved by tailoring the scattering angles of the reflectors 310a-310c. In addition, the viewing angle of the low absorption state in a standard guest/host device is compromised by the absorption of off-axis rays in the vertical (light) state. Including the reflectors 310a-310c as discussed herein allows the recovery of some of that light.

Figure 5:
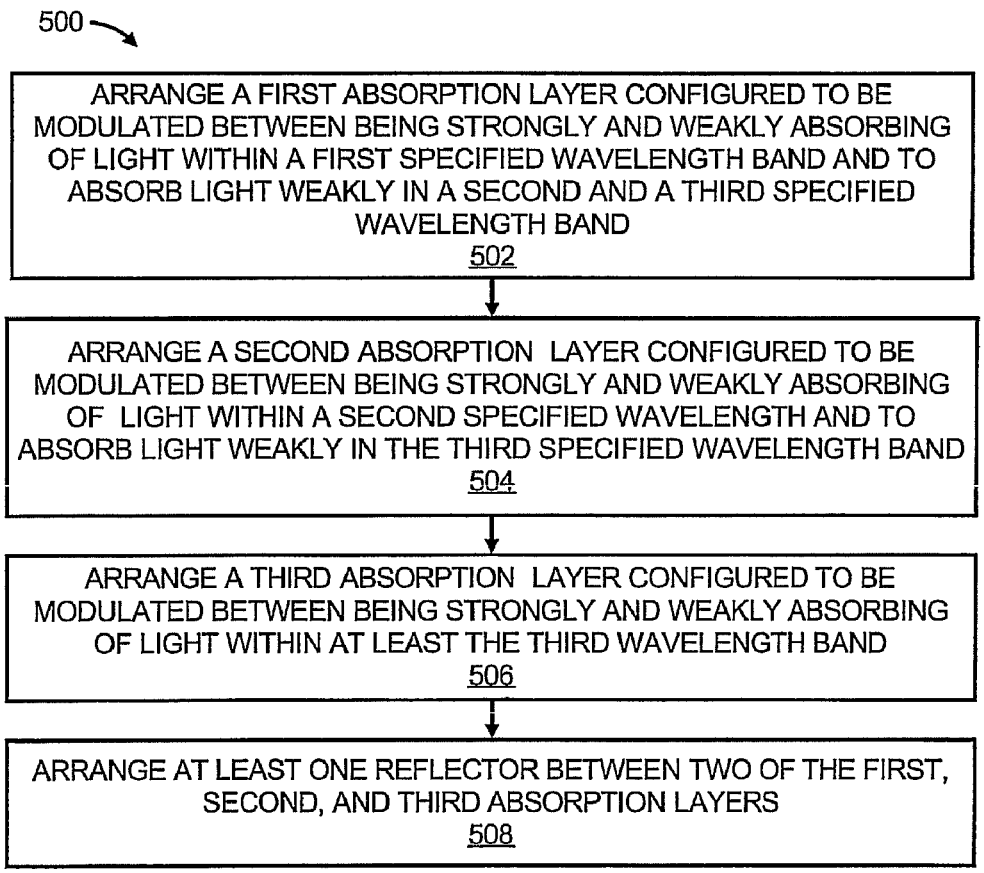
FIG. 5 illustrates a flowchart of a method of fabricating a reflective display device, according to an embodiment of the present invention.

Turning now to FIG. 5, there is shown a method 500 of fabricating a reflective display device 300, according to an embodiment. It should be apparent to those of ordinary skill in the art that the method 500 represents a generalized illustration and that other steps may be added or existing steps may be removed, modified or rearranged without departing from a scope of the method 500. In addition, the method 500 is described with particular reference to FIGS. 3 and 4 by way of example and not of limitation.

In one respect, the method 500 may be implemented to fabricate the reflective display device 300 to be optimized by selectively arranging absorption layers 308a-308c and one or more reflectors 310a-310c having various characteristics with respect to each other. By way of example, the method 500 may be implemented to fabricate a reflective display device 300 having optimized brightness and/or color gamut given the spectral characteristics of available absorption layers. In any regard, each of the absorption layers 308a-308c is configured to strongly absorb light in a specified wavelength band, in which the specified wavelength bands include a blue color, a green color, and a red color as defined above.

At step 502, a first absorption layer 308a is arranged in the display device 300. The first absorption layer 308a is configured to be modulated between being strongly and weakly absorbing of light within a first specified wavelength band and configured to absorb light weakly in a second specified wavelength band and a third specified wavelength band, as discussed above.

At step 504, a second absorption layer 308b is arranged beneath the first absorption layer 308a. The second absorption layer 308b is configured to be modulated between being strongly and weakly absorbing of light within a second specified wavelength band and to absorb light weakly in the third specified wavelength band, as also discussed above.

At step 506, a third absorption layer 308c is arranged beneath the second absorption layer 308b. The third absorption layer 308c is configured to be modulated between being strongly and weakly absorbing of light within at least the third specified wavelength band. Thus, for instance, the third absorption layer 308c may be configured to absorb light that is also outside of the third specified wavelength band.

At step 508, at least one reflector 310a, 310b is arranged between two of the first, second, and third absorption layers 308a-308c. The at least one reflector 310a, 310b is configured to reflect light strongly within one of the specified wavelength bands assigned to the absorption layers 308a, 308b above the at least one reflector 310a, 310b. Furthermore, at least one of the absorption layers 308b, 308c beneath the at least one reflector 310a, 310b is configured to more than weakly absorb light within the wavelength band that the at least one reflector 310a, 310b arranged above the at least one absorption layer 308b, 308c is configured to strongly reflect.

According to an embodiment, a respective reflector 310a-310c is arranged beneath each of the first, second, and third absorption layers 308a-308c. The first reflector 310a may be configured to reflect light strongly within the first specified wavelength band. The second reflector 310b may be configured to reflect light strongly within the second specified wavelength band.

According to a particular embodiment of the method 500, the first specified wavelength band comprises a blue color. In this embodiment, the absorption spectrum for the first absorption layer 308a has an absorption tail that extends into the ultraviolet region of the absorption spectrum and a relatively sharp edge at around 490 nm so that the first absorption layer 308a strongly absorbs wavelengths of light that are within the first specified wavelength band and weakly absorbs wavelengths of light that are outside of the first specified wavelength band and that overlap with wavelength bands assigned to the second and third absorption layers 308b and 308c.

According to another particular embodiment of the method 500, the first specified wavelength band comprises a green color. In this embodiment, the absorption spectrum for the first absorption layer 308a has relatively sharp edges at around 490 and 580 nm so that the first absorption layer 308a strongly absorbs wavelengths of light that are within the first specified wavelength band and weakly absorbs wavelengths of light that are outside of the first specified wavelength band and that overlap with wavelength bands assigned to the second and third absorption layers 308b and 308c.

According to a further particular embodiment of the method 500, the first specified wavelength band comprises a red color. In this embodiment, the absorption spectrum for the first absorption layer 308a has an absorption tail in the infrared (IR) region of the absorption spectrum and a relatively sharp edge at around 580 nm.

The absorption layer that best matches the criteria (step 502) discussed above may be used as the first absorption layer 308a. If two or more absorption layers equally meet these criteria, then the selection of which absorption layer to use as the first absorption layer 308a may be based on one or more other criteria. For instance, the eye has lower spatial resolution in the blue channel than in the red or green channels. Therefore, larger pixels may be used in the blue color absorbing layer, reducing the amount of light lost in some of the electrode layers 306 and inter-pixel gaps.

In the embodiments above, the first reflector 310a beneath the first absorption layer 308a is designed to have a reflection spectrum that substantially overlaps the wavelength band to be modulated by the first absorption layer 308a. The reflection spectrum of the first reflector 310a may extend into either the UV or IR without affecting the visible performance. However, the reflector is configured to only weakly reflect wavelengths that overlap with wavelengths assigned to lower layers. More particularly, for instance, standard wavelength selective designs often have sidebands that extend well beyond the designed central wavelength. Typically, it is difficult to design a reflector that has no sidebands at all, but it is often possible to minimize the sidebands on one side of the peak. By way of particular example, if the first absorption layer 308a is blue or red absorbing, then the sidebands on the red or blue side of the reflection peak need only be minimized, respectively.

In addition, the second reflector 310b positioned beneath the second absorption layer 308b may be configured to have a reflection spectrum that overlaps the first specified wavelength band as that light has already been reflected. Moreover, the second reflector 310b is configured to have substantially no side bands overlapping the third specified wavelength band so that it only weakly reflects those wavelengths.

Furthermore, the third reflector 310c positioned beneath the third absorption layer 308c may comprise a broadband reflector, for instance, a metallic surface. However, the third reflector 310c may comprise a dielectric reflector to thus have the same viewing angle dependence as the other reflectors 310a and 310b, which may ensure that the color balance is preserved with the viewing angle.

According to a particular embodiment of the method 500, the first specified wavelength band comprises a blue color, the second specified wavelength band comprises a green color, and the third specified wavelength band comprises a red color. In this embodiment, a yellow dye or pigment is used in the first absorption layer 308a, a magenta dye or pigment is used in the second absorption layer 308b and a cyan dye or pigment is used in the third absorption layer 308c. The peaks, long wavelength sides, and short wavelength sides of the absorption spectra for the various colors are depicted, for instance, in FIG. 2B. As shown therein, the absorption spectra for the various colors have absorption tails on the short wavelength sides of the peaks and the long wavelength sides of each peak are sharper than the short wavelength sides.

The layers are ordered as described above to maximize the brightness, contrast, and the color gamut. The yellow dye or pigment is used in the first absorption layer 308a as it has a sharper edge on the long wavelength side of the peak so that it only absorbs weakly those wavelengths that are outside of the first specified wavelength band and that overlap with wavelength bands assigned to lower layers. The magenta dye or pigment in the second absorption layer 308b absorbs more than weakly those wavelengths that overlap with the first absorption layer 308a because of the tail on the short wavelength side of the absorption peak. The sharp edge on the long wavelength side of the absorption peak ensures that it only absorbs weakly those wavelengths that are outside of the second specified wavelength band and that overlap with wavelength bands assigned to lower layers. The cyan dye or pigment in the third absorption layer 308c absorbs more than weakly wavelengths that overlap with the first two absorption layers 308a and 308b because of the long tail on the short wavelength side of the peak.

In this particular embodiment, a blue reflector 310a is positioned beneath the first absorption layer 308a, a green reflector 310b is positioned beneath the second absorption layer 308b, and broadband reflector 310c may be positioned beneath the third absorption layer 308c. In addition, each of the blue reflector 310a and the green reflector 310b are configured to have reflection spectra in which the sidebands on the long wavelength sides of the peaks are minimized to substantially ensure that the reflectors 310a and 310b do not reflect any light that should be modulated by a subsequent absorption layer 308b, 308c. This may be accomplished, for instance, through implementation of the reflector 400 depicted in FIG. 4, as discussed in greater detail herein above.

According to another particular embodiment of the method 500, in which all of the absorption layers 308a-308c have absorption spectra having tails on the long wavelength sides of the peaks, the absorption layer 308a-308c are configured to be ordered such that the longest wavelength absorbing layers are on top and the reflectors are configured such that the sidebands to the short wavelength side of the peak are minimized. Thus, for instance, in this embodiment, the first specified wavelength band comprises a red color, the second specified wavelength band comprises a green color, and the third specified wavelength band comprises a blue color.

According to a further particular embodiment of the method 500, the first specified wavelength band comprises a blue color, the second specified wavelength band comprises a red color, and the third specified wavelength band comprises a green color. The display device includes a yellow color dye or pigment, a cyan color dye or pigment, and a black color dye or pigment. The yellow color dye or pigment is used in the first absorption layer 308a and has an absorption spectrum with a long tail on the short wavelength side of the peak and is sharp on the long wavelength side of the peak so that it weakly absorbs wavelengths that are outside of the first specified wavelength band and that overlap with wavelength bands assigned to lower layers. The cyan color dye or pigment is used in the second absorption layer 308b and has an absorption spectrum with a long tail on the long wavelength side of the peak and is sharp on the short wavelength side of the peak so that it weakly absorbs wavelengths that are outside of the second specified wavelength band and that overlap with wavelength bands assigned to the lower layer. The black color dye or pigment is used in the third absorption layer 308c. In addition, a blue reflector 310a is positioned between the first absorption layer 308a and the second absorption layer 308b. It has substantially no side bands on the long wavelength side of the peak so that it weakly reflects wavelengths within the second and third specified wavelength bands. A red reflector 310b is positioned between the second absorption layer 308b and the third absorption layer 308c. The red reflector 310b is designed to have no side bands on the short wavelength side of the peak so that it weakly reflects wavelengths within the third specified wavelength band. The third reflector 310c may comprise a broadband reflector or a dielectric reflector configured to strongly reflect wavelengths within all of the specified wavelength bands. The third reflector 310c may instead comprise a reflector configured to strongly reflect light within the third specified wavelength band.

Alternatively, however, the first specified wavelength band may comprise a red color, the second specified wavelength band may comprise a blue color, and the third specified wavelength band may still comprise a green color. In this case, the cyan color dye or pigment may be used in the first absorption layer 308a and the yellow color dye or pigment may be used in the second absorption layer 308b. The order of the blue and red reflectors will be reversed in this case.

According to a further particular embodiment of the method 500, the first specified wavelength band comprises a blue color, the second specified wavelength band comprises a green color, and the third specified wavelength band comprises a red color, and the display includes a yellow color dye or pigment, a red color dye or pigment and a black color dye or pigment. The first absorption layer 308a includes the yellow color dye or pigment and has an absorption spectrum which has a long tail on the short wavelength side and is sharp on the long wavelength side of the peak. The first reflector 310a is configured to reflect blue color light with substantially no side bands on the long wavelength side of the peak. The second absorption layer 308b includes the red color dye or pigment and has an absorption spectrum which has a long tail on the short wavelength side and is sharp on the long wavelength side of the peak and the second reflector 310b is configured to strongly reflect green color light with substantially no side bands on the long wavelength side of the peak. The third absorption layer 308c includes the black color dye or pigment and the third reflector 310c is configured as a broadband reflector.

According to a further particular embodiment of the method 500, the first specified wavelength band comprises a red color, the second specified wavelength band comprises a green color, and the third specified wavelength band comprises a blue color, and the display includes a cyan color dye or pigment, a blue color dye or pigment and a black color dye or pigment. The first absorption layer 308a includes the cyan color dye or pigment and has an absorption spectrum which has a long tail on the long wavelength side and is sharp on the short wavelength side of the peak in the absorption spectrum and the first reflector 310a is configured to strongly reflect red color light with substantially no side bands on the short wavelength side of the peak. The second absorption layer 308b includes the blue color dye or pigment and has an absorption spectrum which has a long tail on the long wavelength side and is sharp on the short wavelength side of the peak and the second reflector 310b is configured to strongly reflect green color light with substantially no side bands on the short wavelength side of the peak. The third absorption layer 308c includes black color dye or pigment.

According to a further particular embodiment of the method 500 the first specified wavelength band comprises a blue color, the second specified wavelength band comprises a red color, and the third specified wavelength band comprises a green color, and the display includes a yellow color dye or pigment, a green color dye or pigment and a black color dye or pigment. The first absorption layer 308a includes the yellow color dye or pigment and has an absorption spectrum which has a long tail on the short wavelength side and is sharp on the long wavelength side of the peak and the first reflector 310a is configured to strongly reflect blue color light and has side bands that are minimized on the long wavelength side of the peak in the absorption spectrum. The second absorption layer 308b includes the green color dye or pigment which strongly absorbs red and blue colors. The second reflector 310b is configured to strongly reflect red color light and has side bands that are minimized on the short wavelength side of the peak in the absorption spectrum. The third absorption layer 308c includes black color dye or pigment.

According to a further particular embodiment of the method 500, the first specified wavelength band comprises a red color, the second specified wavelength band comprises a blue color, and the third specified wavelength band comprises a green color, and the display includes a cyan color dye or pigment, a green color dye or pigment and a black color dye or pigment. The first absorption layer 308a includes the cyan color dye or pigment and has an absorption spectrum which has a long tail on the long wavelength side and is sharp on the short wavelength side of the peak in the absorption spectrum and the first reflector 310a is configured to strongly reflect red color light, which has side bands that are minimized on the short wavelength side of the peak in the absorption spectrum. The second absorption layer 308b includes the green color dye or pigment which strongly absorbs red and blue colors and the second reflector 310b is configured to strongly reflect blue color light, and has side bands that are minimized on the long wavelength side of the peak in the absorption spectrum. The third absorption layer 308c includes the black color dye or pigment.

According to a further particular embodiment of the method 500, the first specified wavelength band comprises a green color, the second specified wavelength band comprises a blue color, and the third specified wavelength band comprises a red color, and the display includes a magenta color dye or pigment, a red color dye or pigment and a black color dye or pigment. The first absorption layer 308*a* includes the magenta color dye or pigment having a sharp top-hat like absorption spectrum to minimize overlaps with the other specified wavelength bands. The first reflector 310*a* is configured to strongly reflect green color light and has minimal side bands on both sides of the peak in the absorption spectrum. The second absorption layer 308*b* includes the red color dye or pigment having an absorption spectrum which has a long tail on the short wavelength side and is sharp on the long wavelength side of the peak and the second reflector 310*b* is configured to strongly reflect blue color light with substantially no side bands on the long wavelength side of the peak. The third absorption layer 308*c* includes black color dye or pigment.

According to a further particular embodiment of the method 500, the first specified wavelength band comprises a green color, the second specified wavelength band comprises a red color, and the third specified wavelength band comprises a blue color, and the display includes a magenta color dye or pigment, a blue color dye or pigment and a black color dye or pigment. The first absorption layer 308*a* includes the magenta color dye or pigment having a sharp top-hat like absorption spectrum to minimize overlaps with other colors and the first reflector 310*a* is configured to reflect green color light and has minimal side bands on both sides of the peak in the absorption spectrum. The second absorption layer 308*b* includes the blue color dye or pigment and has an absorption spectrum which has a long tail on the long wavelength side and is sharp on the short wavelength side of the peak and the second reflector 310*b* is configured to strongly reflect red color light with substantially no side bands on the short wavelength side of the peak. The third absorption layer 308*c* includes black color dye or pigment.

Although particular reference has been made in some of the embodiments above to the third absorption layer 308*c* having a black color dye, it should be understood that in those embodiments, the third absorption layer 308*c* may instead have any color dye or pigment that strongly absorbs the relevant wavelength bands of light for the particular embodiments. Particular examples of embodiments that employ third absorption layers 308*c* having colors other than black are provided below.

According to a further particular embodiment of the method 500, the first specified wavelength band comprises a blue color, the second specified wavelength band comprises a green color, and the third specified wavelength band comprises a red color, and the display includes a yellow color dye or pigment, a red color dye or pigment and a cyan color dye or pigment. The first absorption layer 308*a* includes the yellow color dye or pigment and has an absorption spectrum which has a long tail on the short wavelength side and is sharp on the long wavelength side of the peak in the absorption spectrum and the first reflector 310*a* is configured to reflect blue color light with substantially no side bands on the long wavelength side of the peak. The second absorption layer 308*b* includes the red color dye or pigment having a long tail on the short wavelength side and is sharp on the long wavelength side of the peak and the second reflector 310*b* is configured to reflect green color light with substantially no side bands on the long wavelength side of the peak. The third absorption layer 308*c* includes the cyan color dye or pigment and the third reflector 310*c* is configured as a broadband reflector.

According to a further particular embodiment of the method 500, the first specified wavelength band comprises a blue color, the second specified wavelength band comprises a green color, and the third specified wavelength band comprises a red color, and the display includes a yellow color dye or pigment, a red color dye or pigment and a blue color dye or pigment. The first absorption layer 308*a* includes the yellow color dye or pigment and has an absorption spectrum which has a long tail on the short wavelength side and is sharp on the long wavelength side of the peak in the absorption spectrum and the first reflector 310*a* is configured to reflect blue color light with substantially no side bands on the long wavelength side of the peak. The second absorption layer 308*b* includes the red color dye or pigment and has an absorption spectrum which has a long tail on the short wavelength side and is sharp on the long wavelength side of the peak and the second reflector 310*b* is configured to reflect green color light with substantially no side bands on the long wavelength side of the peak. The third absorption layer 308*c* includes the blue color dye or pigment and the third reflector 310*c* is configured as a broadband reflector. In this embodiment, the reflectors 310*a*-310*c* may have side bands minimized on the red side of the peaks of the absorption spectra.

Although described specifically throughout the entirety of the instant disclosure, representative embodiments of the present invention have utility over a wide range of applications, and the above discussion is not intended and should not be construed to be limiting, but is offered as an illustrative discussion of aspects of the invention.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the invention, wherein the invention is intended to be defined by the following claims and their equivalents in which all terms are mean in their broadest reasonable sense unless otherwise indicated.

What is claimed is:

1. A reflective display device comprising:
a first absorption layer to be modulated between being strongly and weakly absorbing of light within a first specified wavelength band and to absorb light weakly in a second specified wavelength band and a third specified wavelength band;
a second absorption layer arranged beneath the first absorption layer, wherein said second absorption layer is to be modulated between being strongly and weakly absorbing of light within the second specified wavelength band and to absorb light weakly within the third specified wavelength band;
a third absorption layer arranged beneath the second absorption layer, wherein said third absorption layer is to be modulated between being strongly and weakly absorbing of light within at least the third specified wavelength band; and
at least one reflector arranged between two of the first, second, and third absorption layers, wherein the at least one reflector is to reflect light strongly within one of the specified wavelength bands assigned to the absorption layers above the at least one reflector, wherein at least one of the absorption layers beneath the at least one reflector is to more than weakly absorb light within the wavelength band that the at least one reflector arranged above the at least one absorption layer is to strongly reflect, wherein the at least one reflector is formed of a plurality of peaks that are spaced apart from each other at predetermined periodicities and have predetermined heights, and wherein the periodicities and the heights are selected to provide a predetermined scattering of light.

2. The reflective display device according to claim 1, wherein the at least one reflector further comprises:
a first reflector arranged between the first and second absorption layers, wherein said first reflector is to reflect light strongly within the first specified wavelength band; and
a second reflector arranged between the second and third absorption layers, wherein said second reflector is to reflect light strongly within the second specified wavelength band,
wherein the first reflector is to reflect light weakly within the second and the third specified wavelength bands, and wherein the second reflector is to reflect light weakly within the third specified wavelength band.

3. The reflective display according to claim 2, wherein the second reflector is to reflect light more than weakly within the first specified wavelength band.

4. The reflective display according to claim 1, further comprising a third reflector beneath the third absorption layer, wherein the third reflector is to reflect light strongly within at least the third specified wavelength band.

5. The reflective display device according to claim 1, wherein the at least one reflector comprises a diffuse scattering reflector, and wherein the plurality of peaks are arranged according to the following configuration:

3H (LH)$^m$ 3L H 4L, wherein each term in the configuration denotes a peak in the plurality of peaks, and wherein H is a quarter wavelength thickness with a first refractive index, L is a quarter wavelength thickness with a second lower refractive index, and m is a constant value.

6. The reflective display device according to claim 1, wherein the first specified wavelength band comprises a blue color, the second specified wavelength band comprises a red color, and the third specified wavelength band comprises a green color.

7. The reflective display according to claim 1, wherein the first specified wavelength band comprises a blue color, the second wavelength band comprises a green color, and the third wavelength band comprises a red color.

8. The reflective display according to claim 1, wherein the first specified wavelength band comprises the red color, the second specified wavelength band comprises a blue color, and the third specified wavelength band comprises a green color.

9. The reflective display according to claim 1, wherein the first specified wavelength band comprises a red color, the second specified wavelength band comprises a green color and the third specified wavelength band comprises a blue color.

10. The reflective display according to claim 1, wherein the first specified wavelength band comprises a green color, the second specified wavelength band comprises a red color, and the third specified wavelength band comprises a blue color.

11. The reflective display according to claim 1, wherein the first specified wavelength band comprises a green color, the second specified wavelength band comprises a blue color, and the third specified wavelength band comprises a red color.

12. The reflective display according to claim 1, wherein the second absorption layer includes at least one of a red color dye and pigment.

13. The reflective display according to claim 1, wherein the third absorption layer includes at least one of a black color dye and pigment.

14. A method of fabricating a reflective display device, the method comprising:
arranging a first absorption layer to be modulated between being strongly and weakly absorbing of light within a first specified wavelength band and to absorb light weakly in a second specified wavelength band and a third specified wavelength band;
arranging a second absorption layer beneath the first absorption layer, wherein said second absorption layer is to be modulated between being strongly and weakly absorbing of light within the second specified wavelength band and to absorb light weakly within the third specified wavelength band;
arranging a third absorption layer beneath the second absorption layer, wherein said third absorption layer is to be modulated between being strongly and weakly absorbing of light within at least the third specified wavelength band; and
arranging at least one reflector between two of the first, second, and third absorption layers, wherein the at least one reflector is to reflect light strongly within one of the specified wavelength bands assigned to the absorption layers above the at least one reflector, wherein at least one of the absorption layers beneath the at least one reflector is to more than weakly absorb light within the wavelength band that the at least one reflector arranged above the at least one absorption layer is to strongly reflect, wherein the at least one reflector is formed of a plurality of peaks that are spaced apart from each other at predetermined periodicities and have predetermined heights, and wherein the periodicities and the heights are selected to provide a predetermined scattering of light.

15. The method according to claim 14, wherein arranging the at least one reflector further comprises:
arranging a first reflector between the first and second absorption layers, wherein said first reflector is to reflect light strongly within the first specified wavelength band; and
arranging a second reflector between the second and third absorption layers, wherein said second reflector is to reflect light strongly within the second specified wavelength band, wherein the first reflector is to reflect light weakly within the second and the third specified wavelength bands, and wherein the second reflector is to reflect light weakly within the third specified wavelength band.

16. The method according to claim 14, wherein the at least one reflector comprises a diffuse scattering reflector, and wherein plurality of peaks are arranged according to the following configuration:

3H (LH)$^m$ 3L H 4L, wherein each term in the configuration denotes a peak in the plurality of peaks, and wherein H is a quarter wavelength thickness with a first refractive index, L is a quarter wavelength thickness with a second lower refractive index, and m is a constant value.

* * * * *